US012589928B2

(12) United States Patent
Bertani et al.

(10) Patent No.: US 12,589,928 B2
(45) Date of Patent: Mar. 31, 2026

(54) PACKAGING MATERIAL FOR THE FORMATION OF PACKAGING CONTAINERS AND PACKAGING CONTAINER FORMED FROM A PACKAGING MATERIAL

(71) Applicant: Tetra Laval Holdings & Finance S.A., Pully (CH)

(72) Inventors: Giulio Bertani, Carpi (IT); Francesca Tavoni, Modena (IT)

(73) Assignee: Tetra Laval Holdings & Finance S.A., Pully (CH)

( * ) Notice: Subject to any disclaimer, the term of this patent is extended or adjusted under 35 U.S.C. 154(b) by 0 days.

(21) Appl. No.: 17/771,477

(22) PCT Filed: Dec. 1, 2020

(86) PCT No.: PCT/EP2020/084059
§ 371 (c)(1),
(2) Date: Apr. 24, 2022

(87) PCT Pub. No.: WO2021/115839
PCT Pub. Date: Jun. 17, 2021

(65) Prior Publication Data
US 2022/0411152 A1     Dec. 29, 2022

(30) Foreign Application Priority Data
Dec. 10, 2019     (EP) ..................................... 19214761

(51) Int. Cl.
B65D 65/40 (2006.01)
B32B 1/00 (2006.01)
(Continued)

(52) U.S. Cl.
CPC ................ B65D 65/40 (2013.01); B32B 1/00 (2013.01); B32B 3/266 (2013.01); B32B 15/085 (2013.01);
(Continued)

(58) Field of Classification Search
CPC .... B32B 1/02; B32B 1/08; B32B 1/00; B32B 15/085; B32B 15/12; B32B 15/20;
(Continued)

(56) References Cited

U.S. PATENT DOCUMENTS 4,197,949 A * 4/1980 Carlsson ................ B65D 5/065
229/123.3
4,574,952 A * 3/1986 Masui ................ B65D 83/0835
221/48
(Continued)

FOREIGN PATENT DOCUMENTS

CN     1146753 A     4/1997
CN     1235580 A     11/1999
(Continued)

OTHER PUBLICATIONS

International Search Report mailed Feb. 26, 2021, for priority International Patent Application No. PCT/EP2020/084059.
(Continued)

*Primary Examiner* — Yan Lan
(74) *Attorney, Agent, or Firm* — Renner, Otto, Boisselle & Sklar, LLP

(57)     ABSTRACT
A packaging material for the formation of packaging containers comprising at least a base layer having a hole and at least one separation element covering the hole. The hole extends within a plane being defined by a longitudinal axis and a transversal axis orthogonal to the longitudinal axis. An imaginary longitudinal line parallel to the first longitudinal axis and an imaginary transversal line parallel to the trans-
(Continued)

versal axis mutually intersect at a center point of the hole. A first maximum extension of the hole along the imaginary longitudinal line is larger than a second maximum extension of the hole along the imaginary transversal line. The hole is asymmetric with respect to the imaginary transversal line.

19 Claims, 2 Drawing Sheets

(51) Int. Cl.

| | |
|---|---|
| B32B 1/02 | (2006.01) |
| B32B 3/26 | (2006.01) |
| B32B 15/085 | (2006.01) |
| B32B 15/12 | (2006.01) |
| B32B 15/20 | (2006.01) |
| B32B 27/08 | (2006.01) |
| B32B 27/10 | (2006.01) |
| B32B 27/30 | (2006.01) |
| B32B 27/32 | (2006.01) |
| B65D 5/72 | (2006.01) |

(52) U.S. Cl.
CPC .............. *B32B 15/12* (2013.01); *B32B 15/20* (2013.01); *B32B 27/08* (2013.01); *B32B 27/10* (2013.01); *B32B 27/306* (2013.01); *B32B 27/32* (2013.01); *B65D 5/72* (2013.01); *B32B 2307/31* (2013.01); *B32B 2307/71* (2013.01); *B32B 2307/7242* (2013.01); *B32B 2439/62* (2013.01); *B32B 2439/70* (2013.01)

(58) Field of Classification Search
CPC ............ B32B 2307/31; B32B 2307/71; B32B 2307/7242; B32B 2439/62; B32B 2439/70; B32B 27/08; B32B 27/10; B32B 27/306; B32B 27/32; B32B 3/266; Y10T 428/1352; Y10T 428/139; B65D 5/06; B65D 5/74; B65D 5/72; B65D 5/746; B65D 5/749; B65D 65/40
USPC ............................................. 428/34.1, 411.1
See application file for complete search history.

(56) References Cited

U.S. PATENT DOCUMENTS

| | | | |
|---|---|---|---|
| 4,830,273 | A | 5/1989 | Kalberer et al. |
| 5,875,958 | A | 3/1999 | Weiteder et al. |
| 6,454,161 | B1 | 9/2002 | Rendina et al. |
| 6,938,819 | B2 | 9/2005 | Bergerioux et al. |
| 2003/0205613 | A1* | 11/2003 | Schliebner ......... B65D 83/0805 |
| | | | 229/118 |
| 2004/0045854 | A1* | 3/2004 | Bergerioux ............ B65D 5/727 |
| | | | 206/431 |
| 2005/0079303 | A1* | 4/2005 | Lasson .................... B32B 38/04 |
| | | | 428/138 |
| 2022/0411152 | A1 | 12/2022 | Bertani et al. |

FOREIGN PATENT DOCUMENTS

| | | | |
|---|---|---|---|
| CN | 1340015 | A | 3/2002 |
| CN | 106456364 | A | 2/2017 |
| CN | 108357749 | A | 8/2018 |
| CN | 208086241 | U | 11/2018 |
| CN | 215973044 | U | 3/2022 |
| DE | 4409946 | A1 | 9/1995 |
| EP | 3214005 | A1 | 9/2017 |
| EP | 3219633 | A1 | 9/2017 |
| JP | H08198253 | A | 8/1996 |
| JP | H11130168 | A * | 5/1999 |
| JP | 2019026284 | A * | 2/2019 |

OTHER PUBLICATIONS

First Office Action dated May 28, 2024, for Chinese Application No. 202011421816.3.
Gu Lin et al.; Food Machinery and Equipment; A Ministerial-level Textbook for the "13th Five-Year Plan" for General Higher Education Undergraduates; Nov. 19, 2024.
Tang Lili et al.; Food Machinery and Equipment; A Series of Textbooks for the Food Majors in Higher Vocational Colleges in China; Chongquing University Press; Nov. 18, 2024.

\* cited by examiner

PACKAGING MATERIAL FOR THE FORMATION OF PACKAGING CONTAINERS AND PACKAGING CONTAINER FORMED FROM A PACKAGING MATERIAL

TECHNICAL FIELD

The present invention relates to a packaging material, in particular a multi-layer packaging material, for the formation of packaging containers.

Advantageously, the present invention also relates to a packaging container, in particular a packaging container for a pourable product, even more particular for a pourable food product, formed from a packaging material, in particular from a packaging material having a multilayer structure.

BACKGROUND ART

As is known, many liquid or pourable products, such as food products including fruit juice, UHT (ultra-high-temperature treated) milk, wine, tomato sauce, etc., are sold in packaging containers made of a packaging material having a multilayer structure.

It is known to form the packaging containers from the packaging material within automatic packaging machines, which form the packaging containers from the packaging material and fill the packaging containers with the pourable product during the formation process (prior to the final formation of the packaging container).

Furthermore, it is known that some types of packaging containers are provided with respective pouring outlets, each covered with a respective rupturable separation element, so as to allow the outpouring of the pourable product after partial or full removal of the separation element. Prior to its partial or full removal each separation element protects the pourable product present within the packaging container from an (hostile) outer environment.

Typically, these holes and the respective separation elements originate already from the packaging material.

A typical example of such a packaging material comprises a base layer of e.g. a fibrous material providing the required stiffness and strength to the packaging material and being provided with at least one hole defining the respective pouring outlet of the respective packaging container and at least one covering layer covering the base layer.

Typically, such a hole and accordingly the respective pouring outlet has a circular shape.

A drawback has been found in the flow behavior of the pourable product from the packaging container as in some cases a spilling of the pourable product occurs. Such a drawback is more pronounced with smaller sized packaging containers than with larger-sized ones.

Therefore, there is a need seen in the sector to improve the known packaging containers and/or the packaging material used for forming the packaging containers.

DISCLOSURE OF INVENTION

It is therefore an object of the present invention to provide in a straightforward and low-cost manner an improved packaging material, in particular a multilayer packaging material, for the formation of packaging containers for a pourable product, in particular a pourable food product.

It is a particular object of the present invention to provide in a straightforward and low-cost manner an improved packaging material, in particular a multilayer packaging material, for the formation of packaging containers having an improved outpouring behavior of the pourable product packaged therein.

It is a further object of the present invention to provide in a straightforward and low-cost manner a packaging container, in particular filled or fillable with a pourable product, even more particular filled or fillable with a pourable food product.

It is a particular object of the present invention to provide in a straightforward and low-cost manner a packaging container, in particular filled or fillable with a pourable product, even more particular filled or fillable with a pourable food product, having an improved outpouring behavior of the pourable product out of the packaging container.

According to the present invention, there is provided a packaging material according to independent claim 1.

Further advantageous embodiments of the packaging material are specified in the dependent claims.

According to the present invention, there is also provided a packaging container according to claim 15.

BRIEF DESCRIPTION OF THE DRAWINGS

Two non-limiting embodiments of the present invention will be described by way of example with reference to the accompanying drawings, in which.

BEST MODES FOR CARRYING OUT THE INVENTION

Number 1 indicates as a whole a packaging material (partially shown in FIGS. 1 and 3) for the formation of a packaging container 2 (partially shown in FIG. 2) for a pourable product, in particular a pourable food product such as fruit juice, milk (e.g. ultra-high-temperature treated milk), wine, tomato sauce, sugar, salt and others.

According to a possible non-limiting embodiment, packaging material 1 is in the form of a single blank configured to allow for the formation of one respective packaging container. According to such an embodiment, a plurality of single blanks are fed into an automatic packaging machine for forming a plurality of respective packaging containers 2 from the plurality of blanks and filling packaging containers 2 with the pourable product during the formation of the packaging containers 2 from the single blanks.

Alternatively, and according to a preferred non-limiting embodiment, packaging material 1 is provided in the form of a web of packaging material, with the web of packaging material being configured to allow for the production of a plurality of packaging containers. In particular, the web of packaging material comprises a succession of (substantially identical and connected) blanks, each of which is intended to form a respective packaging container 2.

Preferentially but not necessarily, the web of packaging material is formed within an automatic packaging machine into a tube, the tube is filled with the pourable product and the single packaging containers are formed from the tube (according to the respective blanks).

Alternatively, the web of packaging material is fed to an automatic packaging machine and is cut therein into single blanks so that the single packaging containers 2 are formed from the blanks obtained from cutting the web of packaging material within the automatic packaging machine.

Figure 3:
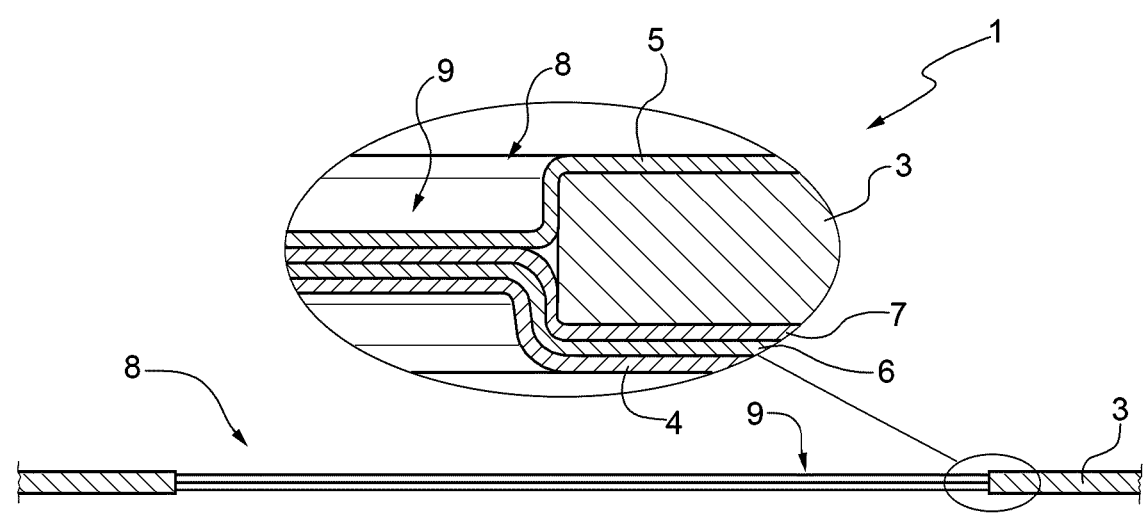
FIG. 3 is a schematic side view of a detail of the packaging material according to the present invention, with parts removed for clarity.

With particular reference to FIG. 3, packaging material 1 has a multilayer structure.

In particular, packaging material 1 comprises at least:
a base layer 3 providing for the required stiffness and strength of packaging material 1 (and packaging container 2 eventually formed therefrom);
a first cover layer 4, in particular of a heat-seal plastic material such as polyethylene; and
a second cover layer 5, in particular of heat-seal plastic material such as such as polyethylene.

In particular, first cover layer 4 and second cover layer 5 interpose base layer 3 between one another.

Preferentially, base layer 3 comprises a fibrous material such as e.g. paper, cardboard or similar, and/or a mineral-filled polypropylene material.

According to a preferred non-limiting embodiment, first cover layer 4 defines an inner face of packaging container 2 eventually contacting the pourable product.

Preferably but not necessarily, packaging material 1 also comprises a gas- and light-barrier layer 6 comprising a gas- and light-barrier material, such as an aluminum foil or ethylene vinyl alcohol (EVOH) film. In particular, gas—and light-barrier layer 6 is arranged between first cover layer 4 and base layer 3.

Preferably but not necessarily, packaging material 1 also comprises a further cover layer 7, in particular of heat-seal plastic material such as polyethylene, being interposed between gas- and light-barrier layer 6 and base layer 3.

Figure 1:
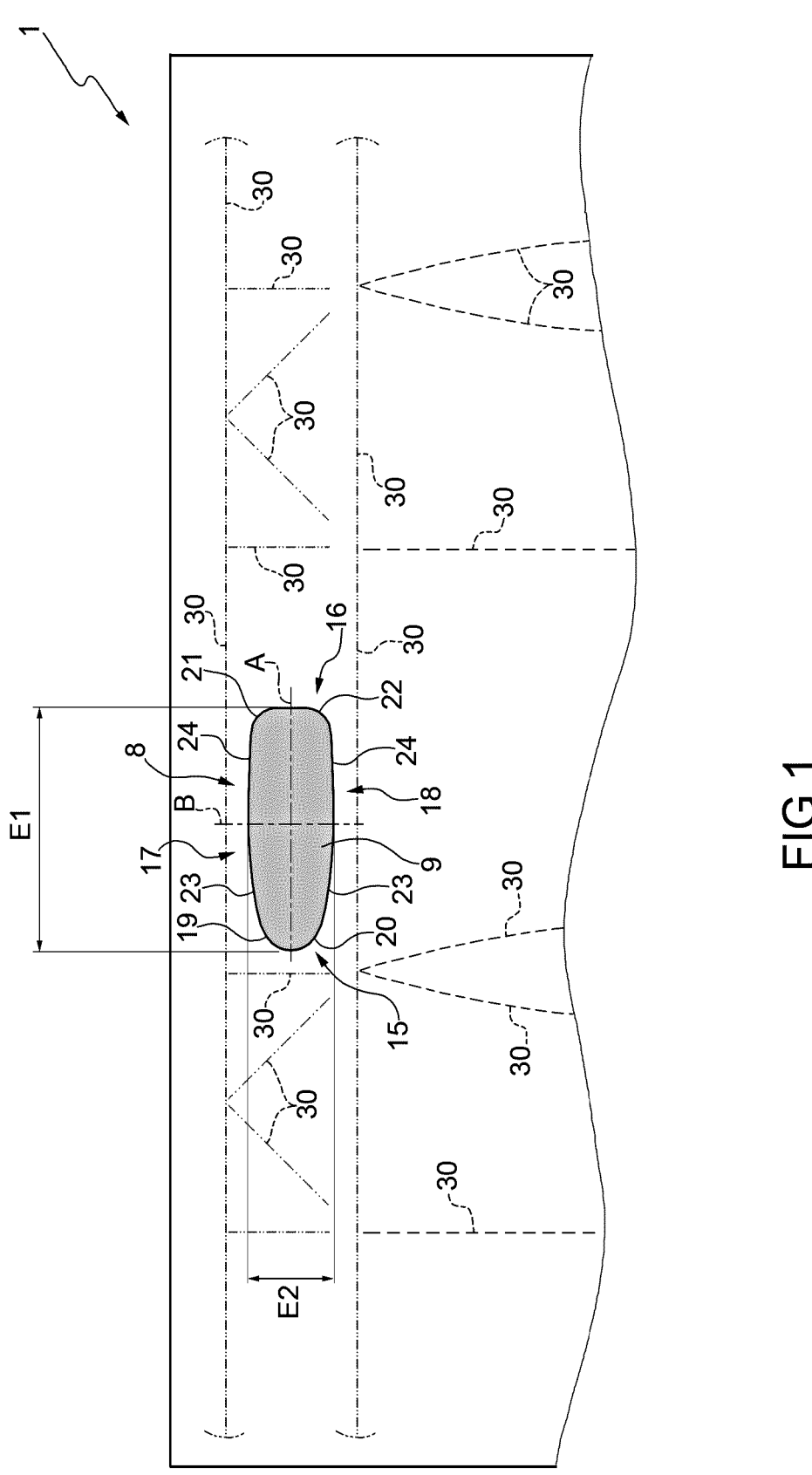
FIG. 1 is a partially shown schematic top view of a packaging material according to the present invention, with parts removed for clarity.
Figure 2:
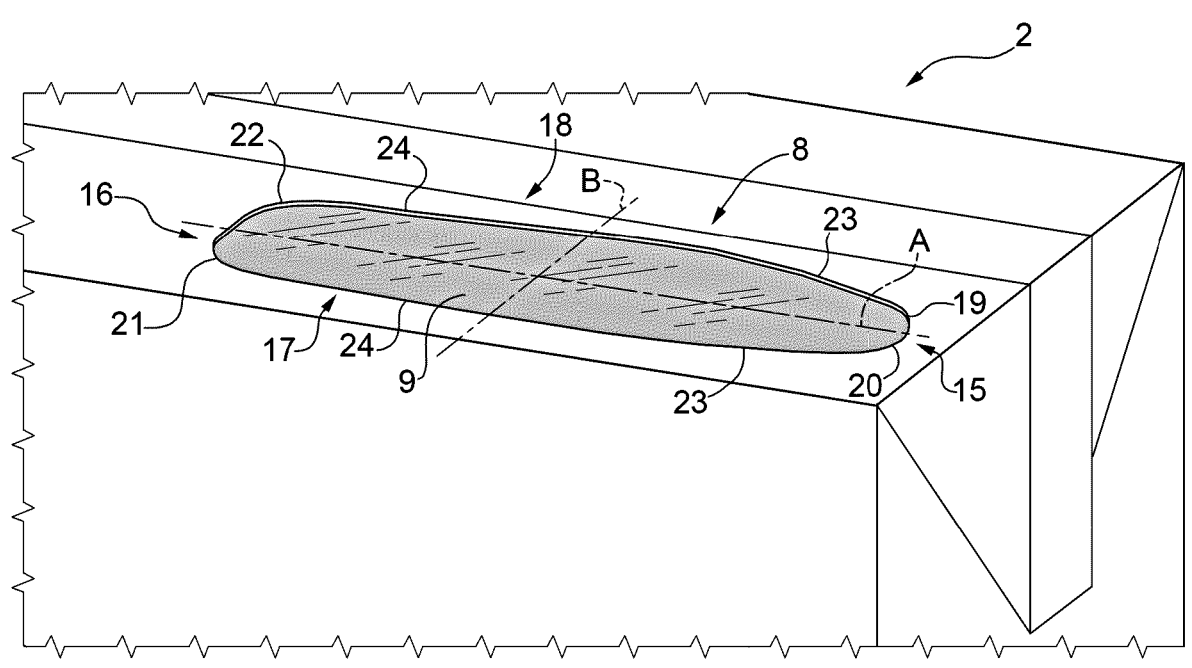
FIG. 2 is a partially shown schematic perspective view of a packaging container formed from the packaging material according to the present invention, with parts removed for clarity.

With particular reference to FIGS. 1 and 2, base layer comprises at least one hole 8. In particular, hole 8 defines a pouring outlet of packaging container 2 through which, in use, the pourable product can flow out of the respective packaging container 2.

According to a preferred non-limiting embodiment and in particular with packaging material 1 being present in the form of a web of packaging material, base layer 3 comprises a plurality of holes 8 equally spaced apart from one another. In particular, each hole 8 is associated to one respective blank of the succession of (connected) blanks forming the web of packaging material and/or each hole 8 is associated to one respective packaging container 2 (and defines the respective pouring outlet).

With particular reference to FIGS. 1 to 3, packaging material 1 also comprises a separation element 9 covering hole 8. In particular, in the case of packaging material 1 being in the form of a web of packaging material, packaging material 1 comprises a plurality of separation elements 9 each one covering one respective hole 8.

In particular, each separation element 9 is configured to separate an inner environment of the eventually formed respective packaging container 2 from an (hostile) outer environment.

Preferentially, each separation element 9 is rupturable and/or pierceable and/or cuttable and/or openable and/or removable in order to allow, in use, for the outflow of the pourable product through the respective hole 8 (pouring outlet).

According to a preferred non-limiting embodiment, each separation element 9 is formed from a respective portion of first cover layer 4 and/or of a respective portion of second cover layer 5 and/or of a respective portion of gas- and light-barrier layer 6 and/or of a respective portion of further cover layer 7.

According to the specific example shown in FIG. 3, each hole 8 is covered by the respective separation element 9 comprising respective portions of first cover layer 4, gas- and light-barrier layer 6, further cover layer 7 and second cover layer 5.

According to an alternative non-limiting embodiment, each separation element 9 could be different and separate from first cover layer 4 and second cover layer 5 and gas—and light-barrier layer 6 and further cover layer 7.

Advantageously, each hole 8 extends within a plane being defined by a longitudinal axis and a transversal axis orthogonal to the longitudinal axis.

Advantageously, a respective imaginary longitudinal line A parallel to the first longitudinal axis and a respective imaginary transversal line B parallel to the respective transversal line B mutually intersect at a respective center point of a respective hole 8. In particular, each imaginary longitudinal line A and the respective imaginary transversal line B are perpendicular to one another.

In more detail, each hole 8 is delimited by a respective rim (provided within base layer 3).

In particular, each center point is determined such that the respective distances along the respective imaginary longitudinal line A between a first point of the rim and the center point and a second point of the rim opposite to the first point (along the respective imaginary longitudinal line A) and the center point equal one another; and the respective distances along the respective imaginary transversal line B between a third point of the rim and the center point and a fourth point of the rim opposite to the third point (along the respective imaginary transversal line B) and the center point equal one another.

According to a preferred non-limiting embodiment, each hole 8 is delimited by (or in other words, the respective rim comprises) a respective first lateral edge 15, a second lateral edge 16 (spaced apart from the respective first lateral edge 15 along the respective longitudinal axis), a first longitudinal edge 17 and a second longitudinal edge 18 (spaced apparat from the first longitudinal edge 17 along the respective transversal axis). In particular, each first lateral edge 15 and the respective second lateral edge 16 extend along a direction substantially parallel to the respective transversal axis and the respective first longitudinal edge 17 and the respective second longitudinal edge 18 extend along a direction substantially parallel to the respective longitudinal axis.

In particular, each first lateral edge 15 and the respective second lateral edge 16 are transversal to the respective first longitudinal edge 17 and the respective second longitudinal edge 18.

Advantageously, each hole 8 has a respective first maximum extension E1 along the respective longitudinal axis and a respective second maximum extension E2 along the respective transversal axis. In particular, the respective first maximum extension E1 is larger than the second maximum extension E2. In other words, each hole 8 is an extended hole. In even other words, each hole 8 is longer than wider.

In particular, each first maximum extension E1 and each second maximum extension E2 are determined by measuring the maximum distance between respectively the respective first lateral edge 15 and the respective second lateral edge 16 along the respective longitudinal axis and/or the respective imaginary longitudinal line A and the respective first longitudinal edge 17 and the respective second longitudinal edge 18 along the respective transversal axis and/or the respective imaginary transversal line B.

Advantageously, each hole 8 has an asymmetric shape with respect to the respective imaginary transversal line B (i.e. the respective imaginary transversal line B does not divide the respective hole 8 so that the two portions obtained are mirror images of one another; in other words, each hole 8 is not mirror symmetric with respect to the respective imaginary transversal line B).

According to a preferred non-limiting embodiment, each hole 8 is symmetric with respect to the respective imaginary longitudinal line A (i.e. the respective imaginary longitudinal line A acts as a mirror axis; in even other words, each imaginary longitudinal line A divides the respective hole 8 into two portions, which are mirror images of one another).

Preferentially but not necessarily, a ratio between the respective first maximum extension E1 and the second maximum extension E1 ranges between 3/2 and 9/2.

Preferentially but not necessarily, each first maximum extension E1 ranges between 30 mm to 45 mm and/or the respective second maximum extension E2 ranges between 10 mm and 20 mm.

According to some non-limiting embodiments, each first longitudinal edge 17 and the respective second longitudinal edge 18 have larger extensions than the respective extensions of the respective first lateral edge 15 and the respective second lateral edge 16.

Preferentially but not necessarily, the respective extension of each first lateral edge 15 is minor than the respective extension of the respective second lateral edge 16.

Preferentially but not necessarily, the respective extensions of each first longitudinal edge 17 and of the respective second longitudinal edge 18 equal one another. In other words, each hole 8 tapers towards the respective first lateral edge 15.

According to some preferred non-limiting embodiments, each first lateral edge 15 comprises a first connecting portion 19 and a second connecting portion 20 being connected to respectively the respective first longitudinal edge 17 and the respective second longitudinal edge 18.

Preferentially but not necessarily, each first connecting portion 19 and each second connecting portion 20 is curved, in particular is outwardly convex.

Preferentially but not necessarily, each first connecting portion 19 and/or each second connecting portion 20 has a respective first radius of curvature, in particular ranging between 3.5 mm to 5 mm, even more particular being equal to 4.25 mm.

According to some preferred non-limiting embodiments, each second lateral edge 16 comprises a third connecting portion 21 and a fourth connecting portion 22 being connected to respectively the respective first longitudinal edge 17 and the respective second longitudinal edge 18.

Preferentially but not necessarily, each third connecting portion 21 and each fourth connecting portion 22 are curved, in particular being outwardly convex.

Preferentially but not necessarily, each third connecting portion 21 and/or each fourth connecting portion 22 has a respective second radius of curvature, in particular ranging between 3.5 mm to 5 mm, even more particular the respective second radius of curvature being 4.0 mm.

Preferentially but not necessarily, each first radius of curvature is different from the respective second radius of curvature, in particular each first radius of curvature is larger than the respective second radius of curvature.

According to some preferred non-limiting embodiments, each first longitudinal edge 17 and/or each second longitudinal edge 18 comprises a respective first section 23 and a respective second section 24, in particular being connected to one another.

Preferentially but not necessarily, each first section and each second section 24 has a curved shape, in particular each first section 13 and each second section 24 is outwardly convex.

Preferentially but not necessarily, each first section 23 has a respective third radius of curvature ranging between 55 mm to 65 mm, in particular being 60 mm, and/or each second section 24 has a respective fourth radius of curvature ranging between 235 mm and 245 mm, in particular being 241 mm.

Preferentially but not necessarily, each third radius of curvature is different from the respective fourth radius of curvature, in particular each third radius of curvature is smaller than the respective fourth radius of curvature.

Preferentially but not necessarily, each third radius of curvature and each fourth radius of curvature is different from, in particular is larger than, the respective first radius of curvature and the respective second radius of curvature.

Preferentially but not necessarily, each first section 23 is connected to the respective first lateral edge 15 and each second section 24 is connected to the respective second lateral edge 16.

According to some preferred non-limiting embodiments, packaging material 1, in particular each blank, comprises a plurality of crease lines 30 along which, in use, packaging material 1, in particular each blank, is folded (in order to define the shape of the respective package containers 2).

Preferentially but not necessarily, each hole 8 is arranged in an area delimited by two crease lines 30 parallel to the respective longitudinal axis and two crease lines 30 parallel to the respective transversal axis. In particular, there are no further crease lines arranged within the respective area of each hole 8.

The advantages of packaging material 1 according to the present invention will be clear from the foregoing description.

In particular, by providing for an elongated hole 8 having an elongated configuration and an asymmetric shape with the respective imaginary transversal line B, one obtains, in use, an improved flow characteristic of the pourable product. In particular, in use, hole 8 allows for the development of a space above the flow of the pourable product leading to air being able to enter, thereby avoiding gulping and spilling.

Clearly, changes may be made to packaging material 1 and/or packaging container 2 as described herein without, however, departing from the scope of protection as defined in the accompanying claims.

According to an alternative non-limiting embodiment not shown, each packaging container 2 could be provided with opening means allowing for the rupturing and/or removal and/or opening and/or cutting of the respective separation element 9.

The invention claimed is:

1. A packaging material for the formation of a packaging container including a top side, packaging material bounded by a first edge and second edge opposite the first edge, and comprising:

at least a base layer having a hole;

a first cover layer and a second cover layer located on opposite sides of the base layer, such that the base layer is located between the first cover layer and the second cover layer;

a gas and light layer comprising a gas and light barrier material located between the first cover layer and the base layer; and a further cover layer interposed between the gas and light barrier layer and the base layer;

wherein the first cover layer, the further cover layer, the gas and light barrier layer, and the second cover layer extend across the hole to form a separation element covering the hole;

wherein the hole extends within a plane being defined by a longitudinal axis and a transversal axis orthogonal to the longitudinal axis;

wherein an imaginary longitudinal line parallel to a first longitudinal axis and an imaginary transversal line parallel to the transversal axis mutually intersect at a center point of the hole;

wherein a first maximum extension of the hole along the imaginary longitudinal line is larger than a second maximum extension of the hole along the imaginary transversal line;

wherein the hole is arranged in an area forming the top side of the packaging container, the area delimited by:

two transverse crease lines parallel to the transversal axis comprising a first transverse crease line and a second transverse crease line; and two longitudinal crease lines parallel to the longitudinal axis comprising a first longitudinal crease line and a second longitudinal crease line;

wherein the first transverse crease line forms a first side edge of the top side and the second transverse crease line forms a second side edge of the top side, the second side edge being opposite to the first side edge;

wherein the second longitudinal crease line forms a front edge of top side;

wherein the first longitudinal crease line is parallel to the first edge of the packaging material;

wherein the packaging material is configured to be sealed to form the top side of the packaging container by binding together as a seam the packaging material between the first edge and the first longitudinal crease line;

wherein the first longitudinal crease line is located between the hole and the first edge, such that the hole located apart from the seam;

wherein the hole has a first lateral edge and a second lateral edge;

wherein the first lateral edge is substantially parallel to the first transverse crease line and the second lateral edge is substantially parallel to the second transverse crease line;

wherein the first lateral edge is closer along the longitudinal axis to the first transverse crease line than the second lateral edge is to the second transverse crease line;

wherein the hole has an elongated asymmetric shape with respect to the imaginary transversal line that tapers towards the first lateral edge, such that:

the first lateral edge is narrower than the second lateral edge;

the second lateral edge is wider than the first lateral edge;

the narrower first lateral edge is closer to the first transverse crease line than the wider second lateral edge is to the second transverse crease line.

2. The packaging material according to claim 1, wherein the hole is symmetric with respect to the imaginary longitudinal line.

3. The packaging material according to claim 1, wherein a ratio between the first maximum extension and the second maximum extension ranges between 3/1 and 9/2.

4. The packaging material according to claim 1, wherein the first maximum extension ranges between 30 mm to 45 mm and/or the second maximum extension ranges between 10 mm and 20 mm.

5. The packaging material according to claim 1, wherein the hole is delimited by the first lateral edge, the second lateral edge, a first longitudinal edge, and a second longitudinal edge;

wherein extensions of the first longitudinal edge and of the second longitudinal edge are larger than extensions of the first lateral edge and the second lateral edge;

wherein the extension of the first lateral edge is smaller than the extension of the second lateral edge.

6. The packaging material according to claim 5, wherein extensions of the first longitudinal edge and of the second longitudinal edge equal one another.

7. The packaging material according to claim 5, wherein the first lateral edge comprises a first connecting portion being connected to the first longitudinal edge and a second connecting portion being connected to the second longitudinal edge;

wherein the first connecting portion and the second connecting portion are curved.

8. The packaging material according to claim 7, wherein a radius of curvature of the first connecting portion and/or of the second connecting portion ranges between 3.75 mm to 5 mm.

9. The packaging material according to claim 7, wherein the first connecting portion and/or the second connecting portion is/are outwards convex.

10. The packaging material according to claim 5, wherein the second lateral edge comprises a third connecting portion being connected to the first longitudinal edge and a fourth connecting portion being connected to the second longitudinal edge;

wherein the third connecting portion and the fourth connecting portion are curved.

11. The packaging material according to claim 10, wherein a radius of curvature of the third connecting portion and/or of the fourth connecting portion ranges between 3.5 mm to 5 mm.

12. The packaging material according to claim 10, wherein the third connecting portion and/or the fourth connecting portion are outwards convex.

13. The packaging material according to claim 5, wherein the first longitudinal edge and/or the second longitudinal edge comprises a first section and a second section;

wherein the first section and the second section has a curved shape.

14. The packaging material according to claim 13, wherein each first section has a radius of curvature ranging between 55 mm to 65 mm and/or each second section has a radius of curvature ranging between 235 mm and 245 mm.

15. The packaging container formed from a packaging material according to claim 1.

16. The packaging container according to claim 1 further comprising a plurality of crease lines, including the first transverse crease line and the second transverse crease line, along which the packaging material is folded, wherein:

the first maximum extension ranges between 30 mm to 45 mm; and the second maximum extension ranges between 10 mm and 20 mm.

17. The packaging material according to claim 1, wherein the separation element includes the first cover layer, the further cover layer, the gas and light barrier layer and the second cover layer bounded together without the base layer.

18. Packaging material for the formation of a packaging container, including a top side, the packaging material bounded by a first edge and second edge opposite the first edge, and the packaging material comprising at least:

a base layer configured to provide stiffness and strength and having a hole, a first cover layer, a second cover layer, a gas- and light-barrier layer comprising a gas- and light-barrier material, a further cover layer, being interposed between the gas- and light-barrier layer and the base layer, and at least one separation element covering the hole, wherein the separation element is formed from a portion of the first cover layer and/or of the second cover layer and/or of the light-barrier layer and/or of the further cover layer;

wherein the hole extends within a plane being defined by a longitudinal axis and a transversal axis orthogonal to the longitudinal axis;

wherein the hole is arranged in an area forming the top side packaging container, the area being delimited by:

two transverse crease lines parallel to the transversal axis comprising a first transverse crease line and a second transverse crease line; and two longitudinal crease lines parallel to the longitudinal axis comprising a first longitudinal crease line and a second longitudinal crease line;

wherein the second longitudinal crease line forms a front edge of the top side;

wherein the first longitudinal crease line is parallel to the first edge of the packaging material;

wherein the packaging material is configured to be sealed to form the top side of the packaging container by binding together as a seam the packaging material between the first edge and the first longitudinal crease line;

wherein the first longitudinal crease line is located between the hole and the first longitudinal edge, such that the hole located apart from the seam;

wherein an imaginary longitudinal line parallel to the longitudinal axis and an imaginary transversal line parallel to the transversal axis mutually intersect at a respective center point of the hole;

wherein a first maximum extension of the hole along the imaginary longitudinal line is larger than a second maximum extension of the hole along the imaginary transversal line;

wherein the hole has an asymmetric shape with respect to the imaginary transversal line, wherein the packaging material comprises a plurality of crease lines along which, in use, the packaging material is folded, and wherein the first maximum extension ranges between 30 mm to 45 mm and the second maximum extension ranges between 10 mm and 20 mm and in that the hole is arranged in an area delimited by two crease lines parallel to the longitudinal axis and two crease lines parallel to the transversal axis.

19. The packaging material according to claim 18, wherein the first cover layer, the further cover layer, the gas and light barrier layer, and the second cover layer extend across the hole to form a separation element covering the hole, wherein the separation element includes the first cover layer, the further cover layer, the gas and light barrier layer and the second cover layer bounded together without the base layer.

* * * * *